(12) United States Patent
Itoga et al.

(10) Patent No.: US 8,534,052 B2
(45) Date of Patent: Sep. 17, 2013

(54) EXHAUST GAS TREATMENT APPARATUS FOR WORKING MACHINE

(75) Inventors: Kentaro Itoga, Tsuchiura (JP); Yasushi Arai, Tsuchiura (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 387 days.

(21) Appl. No.: 13/037,959

(22) Filed: Mar. 1, 2011

(65) Prior Publication Data

US 2011/0219744 A1    Sep. 15, 2011

(30) Foreign Application Priority Data

Mar. 10, 2010  (JP) ................................. 2010-053467

(51) Int. Cl.
*F01N 3/00*    (2006.01)

(52) U.S. Cl.
USPC .................. 60/287; 60/284; 60/285; 60/295; 37/348

(58) Field of Classification Search
USPC ...................... 60/295, 285, 284; 37/348, 403; 414/685

See application file for complete search history.

(56) References Cited

FOREIGN PATENT DOCUMENTS

| JP | 7-166840 A | 6/1995 |
| JP | 07166840 A * | 6/1995 |
| JP | 3073380 | 6/2000 |
| WO | WO 2009/060719 A1 | 5/2009 |

OTHER PUBLICATIONS

Japanese-language Office Action (five (5) pages) 2010.

* cited by examiner

*Primary Examiner* — Thomas Denion
*Assistant Examiner* — Matthew T Largi
(74) *Attorney, Agent, or Firm* — Crowell & Moring LLP (57) ABSTRACT

An exhaust gas treatment apparatus for a working machine is provided to reliably prevent a specific process that raises the exhaust temperature of an exhaust gas treatment section from being carried out during switching operation of a directional control valve. The apparatus includes: a directional control valve that controls the flow of pressure oil supplied to an actuator; a pilot pump that supplies pressure oil to an operating device operated to switch the directional control valve; an open/close valve arranged downstream of the directional control valve; a control valve that controls the open/close valve; a lock valve arranged between the pilot pump and the operating device; a detecting section that detects when a specific process that raises the exhaust temperature of an exhaust gas treatment section becomes necessary, and outputs the corresponding detection signal; a controller that controls the control valve; and a pipe for performing a process of setting the open/close valve to an open position in accordance with the pilot pressure oil supplied from the pilot pump.

4 Claims, 5 Drawing Sheets

EXHAUST GAS TREATMENT APPARATUS FOR WORKING MACHINE

BACKGROUND OF THE INVENTION (1) Field of the Invention

This invention relates to an exhaust gas treatment apparatus for a working machine such as a hydraulic excavator which enables a specific process in an exhaust gas treatment section to be carried out, by raising the output of an engine by increasing the hydraulic load on the working machine that is hydraulically driven.

(2) Description of the Related Art

Figure 5:
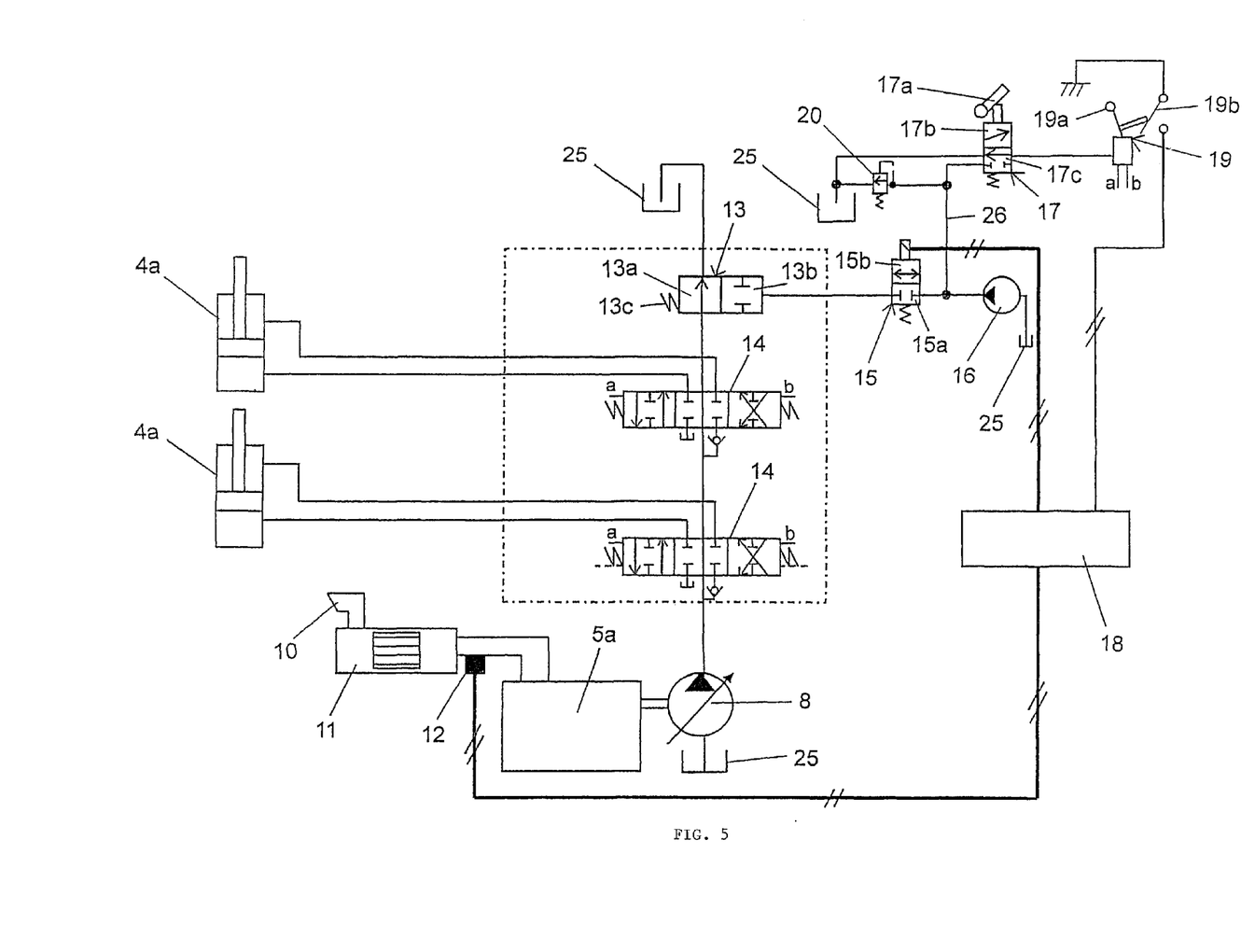
FIG. 5 is a circuit diagram showing an example of an exhaust gas treatment apparatus for a working machine according to the related art.

FIG. 5 is a circuit diagram showing an example of an exhaust gas treatment apparatus for a working machine according to the related art.

In the related art, working machines such as a hydraulic excavator are provided with an exhaust gas treatment apparatus that treats exhaust gas emitted from an engine and then emits the treated exhaust gas to the outside. As shown in FIG. 5, for example, this exhaust gas treatment apparatus includes a hydraulic pump 8 driven by an engine 5a, an actuator 4a that is actuated upon supply of pressure oil from the hydraulic pump 8, a directional control valve 14 that controls the flow of pressure oil supplied to the actuator 4a, and an operating device 19 having an operating lever 19a operated to switch the directional control valve 14.

The exhaust gas treatment apparatus also includes a pilot pump 16 that supplies pressure oil to the operating device 19, an open/close valve 13 that is arranged downstream of the directional control valve 14, and controls the opening and closing of a channel connected to a tank 25, a control valve 15 that is arranged between the open/close valve 13 and the pilot pump 16, and controls the open/close valve 13 to an open position 13a or a close position 13b, and a lock valve 17 that is arranged between the pilot pump 16 and the operating device 19, and can be switched between a lock position 17c for keeping actuation of the actuator 4a disabled, and an unlock position 17b for enabling actuation of the actuator 4a. It should be noted that the hydraulic pump 8, the pilot pump 16, and the lock valve 17 are each connected to the tank 25. A relief valve 20 is provided in a pipe 26 connecting between the pilot pump 16 and the lock valve 17. When the pilot pressure oil supplied from the pilot pump 16 becomes excessive, the relief valve 20 relieves the excess pilot pressure oil to the tank 25.

Further, the exhaust gas treatment apparatus includes an exhaust gas treatment section 11 that is attached to the exhaust port 10 of the engine 5a, and treats exhaust gas emitted from the engine 5a, a detecting section 12 that detects when a specific process that raises the exhaust temperature of the exhaust gas treatment section 11 becomes necessary, and outputs a signal for setting the control valve 15 to an open position 15b, and a controller 18 that controls the control valve 15.

Specifically, the exhaust gas treatment section 11 has in the inside a filter (not shown) with an oxidation catalyst such as platinum. By capturing and oxidizing unburned matter such as carbon hydride or carbon monoxide in exhaust gas with the filter, the exhaust gas treatment section 11 changes the unburned matter into harmless matter such as water or carbon dioxide and then emits the harmless matter. At this time, the oxidation catalyst such as platinum provided in the filter does not exert an effective catalytic effect unless its temperature becomes equal to or higher than a predetermined temperature specific to the oxidation catalyst. Accordingly, if the temperature of exhaust gas flowing into the exhaust gas treatment section 11 is lower than this specific predetermined temperature, the captured unburned matter builds up on the filter without being oxidized. As a result, the emission efficiency of exhaust gas in the exhaust gas treatment section 11 deteriorates, resulting in increased exhaust resistance for the engine 5a. To prevent this, in the related art, it is common to perform a specific process that raises the exhaust temperature of the exhaust gas treatment section 11 by raising the temperature of exhaust gas emitted from the engine 5a. The detecting section 12 includes an exhaust pressure sensor that detects the pressure of exhaust gas flowing into the exhaust gas treatment section 11, and also a temperature sensor that detects the temperature of exhaust gas. When the detecting section 12 detects by the exhaust pressure sensor that the pressure on the upstream side of the oxidation catalyst has become high, and also exhaust temperature is low, the detecting section 12 outputs a signal indicating the start of the above-mentioned specific process.

As an example of an exhaust gas treatment apparatus for a working machine which performs such a specific process, there exists a hydraulic working machine in which the detecting section 12 is provided on the inlet side of an exhaust gas control device provided in a connected fashion to the exhaust port 10 of the engine 5a, in other words, the exhaust gas treatment section 11, and detects the exhaust resistance of the engine 5a, and further, in which the controller 18 includes the function of raising the discharge rate and discharge pressure of pressure oil discharged from the hydraulic pump 8, in other words, raising the output of the engine 5a when the exhaust resistance measured by the detecting section 12 becomes a predetermined preset value or more, thereby raising the temperature of exhaust gas from the engine 5a to a sufficient temperature for enabling the exhaust gas treatment section 11 to exert its exhaust gas treatment capability properly (see, for example, Japanese Patent No. 3073380).

As shown in FIG. 5, in the hydraulic working machine disclosed in Japanese Patent No. 3073380, the operating lever 19a of the operating device 19 is attached with a neutral detection switch 19b for detecting the neutral state of the directional control valve 14. The neutral state of the directional control valve 14 is electrically detected by closing of the circuit of the neutral detection switch 19b, and the above-mentioned specific process is performed only when the directional control valve 14 is in the neutral state, thereby preventing the actuator 4a from operating in a manner not intended by the operator.

In other words, as shown in FIG. 5, when the controller 18 receives a signal indicating the neutral state of the directional control valve 14 on the basis of the neutral detection switch 19b, and the exhaust resistance measured by the detecting section 12 becomes equal to or higher than a predetermined preset value, the controller 18 switches the control valve 15 to the open position 15b that is the upper position, thereby causing the pilot pressure oil from the pilot pump 16 to be supplied to a control part on the right side of the open/close valve 13 via the control valve 15. Thus, the open/close valve 13 is switched to the close position 13b that is the right position. Then, the pipe line leading to the tank 25 is closed, and the discharge pressure of the pressure oil discharged from the hydraulic pump 8 rises simultaneously. This prevents an increased amount of pressure oil being supplied from the hydraulic pump 8 to the actuator 4a due to the specific process while the operator is operating the operating lever 19a of the operating device 19. In other words, operation of the actuator 4a in a manner not intended by the operator is prevented, thus allowing work to be done safely.

SUMMARY OF THE INVENTION

However, in the case of the hydraulic working machine disclosed in Japanese Patent No. 3073380 described above, there is a fear that in the event an electrical fault occurs in the neutral detection switch 19b that directly detects the movement of the operating lever 19a of the operating device 19, for example, in the event of a malfunction such that the circuit of the neutral detection switch 19b closes even through the directional control valve 14 is being switched with the operating lever 19a of the operating device 19, a signal indicating the neutral state of the directional control valve 14 is outputted to the controller 18 from the neutral detection switch 19b. In this case, the controller 18 performs the above-mentioned specific process in which when the exhaust resistance measured by the detecting section 12 becomes a predetermined preset value or more, the control valve 15 is switched to the open position 15b that is the upper position to thereby cause the pilot pressure oil from the pilot pump 16 to be supplied to the control part on the right side of the open/close valve 13 via the control valve 15, and the open/close valve 13 is switched to the close position 13b that is the right position to thereby raise the discharge pressure of the pressure oil discharged from the hydraulic pump 8 simultaneously. Consequently, excess pressure oil is supplied to the actuator 4a while the directional control valve 14 is being switched with the operating lever 19a of the operating device 19, so the speed of the actuator 4a increases, resulting in an operation not intended by the operator.

The present invention has been made in view of the above circumstances of the related art and provides an exhaust gas treatment apparatus for a working machine which can reliably prevent a specific process that raises the exhaust temperature of the exhaust gas treatment section from being carried out during switching operation of the directional control valve.

To this end, according to an embodiment of the present invention, there is provided an exhaust gas treatment apparatus for a working machine, including: a hydraulic pump driven by an engine; an actuator that is actuated upon supply of pressure oil from the hydraulic pump; a directional control valve that controls a flow of the pressure oil supplied to the actuator; an operating device having an operating lever operated to switch the directional control valve; a pilot pump that supplies pressure oil to the operating device; an open/close valve that is arranged downstream of the directional control valve and connected to a tank, and whose neutral position is an open position; a control valve that is arranged between the open/close valve and the pilot pump, and controls the open/close valve to the open position or a close position; a lock valve that is arranged between the pilot pump and the operating device, and can be switched to a lock position for keeping actuation of the actuator disabled; an exhaust gas treatment section that treats exhaust gas emitted from the engine; a detecting section that detects when a specific process that raises an exhaust temperature of the exhaust gas treatment section is necessary, and outputs a signal for setting the control valve to an open position; a controller that controls the control valve; and an open position setting section that performs a process of setting the open/close valve to the open position in accordance with pilot pressure oil supplied from the pilot pump, in which the specific process in the exhaust gas treatment section can be carried out by keeping the open/close valve in the close position and raising an output of the engine.

In the embodiment of the present invention configured as described above, when the lock valve is kept in the lock position, pilot pressure oil is not supplied to the operating device, and accordingly the process of setting the open/close valve to the open position is not performed by the open position setting section. Also, in the state with the lock valve kept in the lock position in this way to disable actuation of the actuator, when the detecting section outputs a signal indicating that it is necessary to start the specific process that raises the exhaust temperature of the exhaust gas treatment section, the control valve is switched to the open position. Thus, the pilot pressure oil from the pilot pump is applied to the control part of the open/close valve via the control valve, and the open/close valve is switched from the open position that is the neutral position to the close position. Then, the flow of pressure oil to the tank is blocked, and the load on the hydraulic pump rises. Accordingly, the output of the engine is raised, and the specific process that raises exhaust temperature is carried out in the exhaust gas treatment section.

On the other hand, to actuate the actuator, the lock valve is unlocked in advance, and pilot pressure oil is supplied from the pilot pump to the operating device via the lock valve. Then, the pilot pressure oil supplied with operation of the operating lever of the operating device is applied to the control part of the directional control valve, causing the directional control valve to switch from the neutral position. Accordingly, the pressure oil discharged from the hydraulic pump is supplied to the actuator via the directional control valve, thereby actuating the actuator.

Therefore, in the state with the lock valve unlocked in this way to enable operation of the operating lever of the operating device, the process of setting the open/close valve to the open position can be performed by the open position setting section in accordance with the pilot pressure oil supplied from the pilot pump, without direct regard to the movement of the operating lever of the operating device. Thus, even when a signal indicating that it is necessary to start the specific process that raises the exhaust temperature of the exhaust gas treatment section is outputted by the detecting section, the load on the hydraulic pump is prevented from increasingly excessively, thus avoiding a situation where, following such an increase in load, the above-described specific process that raises exhaust temperature by raising the output of the engine is started. This makes it possible to reliably prevent the specific process that raises the exhaust temperature of the exhaust gas treatment section from being carried out during switching operation of the directional control valve.

According to an embodiment of the present invention, in the exhaust gas treatment apparatus for a working machine according to the above embodiment of the present invention, the open position setting section includes the pilot pump, the lock valve that is kept in an unlock position for supplying the pilot pressure oil from the pilot pump to the operating device, and a pipe that has one end connected in between the lock valve and the operating device, and introduces the pilot pressure oil for setting the open/close valve to the open position.

In the embodiment of the present invention configured as described above, in the state with the lock valve unlocked in this way to enable actuation of the actuator by operation of the operating lever of the operating device, the pilot pressure oil from the pilot pump is introduced to the control part of the open/close valve by the pipe included in the open position setting section whose one end is connected in between the lock valve and the operating device. Thus, the open/close valve is kept in the open position that is the neural position, thereby making it possible to prevent the specific process that raises the exhaust temperature of the exhaust gas treatment section from being carried out during switching operation of the directional control valve, solely by the simple configuration of simply providing the pipe.

According to an embodiment of the present invention, in the exhaust gas treatment apparatus for a working machine according to the above embodiment of the present invention, the open position setting section includes the pilot pump, the lock valve that is kept in an unlock position for supplying the pilot pressure oil from the pilot pump to the operating device, a pressure sensor that detects a pressure of the pilot pressure oil that has passed through the lock valve, and the controller that controls the control valve to keep a close position in accordance with detection of the pressure of the pilot pressure oil by the pressure sensor.

In the embodiment of the present invention configured as described above, in the state with the lock valve kept in the lock position, the pressure of the pilot pressure oil having passed through the lock valve is not detected by the pressure sensor. In this state, actuation of the actuator is disabled. When, in this state, the detecting section outputs a signal indicating that it is necessary to start the specific process that raises the exhaust temperature of the exhaust gas treatment section, the control valve is switched to the open position. Thus, the pilot pressure oil from the pilot pump is applied to the control part of the open/close valve via the control valve, and the open/close valve is switched from the open position that is the neutral position to the close position. Then, the flow of pressure oil to the tank is blocked, and the load on the hydraulic pump rises. Accordingly, the output of the engine is raised, and the specific process that raises exhaust temperature is carried out in the exhaust gas treatment section.

On the other hand, to actuate the actuator, the lock valve is unlocked in advance, and pilot pressure oil is supplied from the pilot pump to the operating device via the lock valve. Following this, the pilot pressure oil supplied with operation of the operating lever of the operating device is applied to the control part of the directional control valve, causing the directional control valve to switch from the neutral position. At this time, in the open position setting section, the pressure sensor detects the pressure of the pilot pressure oil that has passed through the lock valve and is supplied to the operating device, and outputs the corresponding detection signal to the controller. The controller that has received this signal controls the control valve to keep the close position. Hence, pilot pressure oil is not supplied from the pilot pump to the control part of the open/close valve, thereby avoiding a situation where the open/close valve is switched from the open position to the close position during actuation of the actuator. Therefore, in the open position setting section, the process of setting the open/close valve to the open position can be performed by the controller in accordance with the detection signal of the pressure of the pilot pressure oil having passed through the lock valve which is obtained from the pressure sensor, without direct regard to the movement of the operating lever of the operating device. Accordingly, it is possible to prevent an excessive amount of pressure oil from being supplied from the pilot pump to the actuator due to the above-mentioned specific process during switching operation of the directional control valve, thereby enhancing reliability in operation of the operating lever of the operating device.

According to an embodiment of the present invention, in the exhaust gas treatment apparatus for a working machine according to the above embodiment of the present invention, the open position setting section includes the pilot pump, the lock valve that is kept in an unlock position for supplying the pilot pressure oil from the pilot pump to the operating device, a pressure sensor that detects a pressure of the pilot pressure oil supplied with operation of the operating lever of the operating device, and the controller that controls the control valve to keep a close position in accordance with detection of the pressure of the pilot pressure oil by the pressure sensor.

In the embodiment of the present invention configured as described above, in the state with the lock valve kept in the lock position, the pressure of the pilot pressure oil supplied with operation of the operating lever of the operating device is not detected by the pressure sensor. In this state, actuation of the actuator is disabled. When, in this state, the detecting section outputs a signal indicating that it is necessary to start the specific process that raises the exhaust temperature of the exhaust gas treatment section, the control valve is switched to the open position. Thus, the pilot pressure oil from the pilot pump is applied to the control part of the open/close valve via the control valve, and the open/close valve is switched from the open position that is the neutral position to the close position. Then, the flow of pressure oil to the tank is blocked, and the load on the hydraulic pump rises. Accordingly, the output of the engine is raised, and the specific process that raises exhaust temperature is carried out in the exhaust gas treatment section.

On the other hand, to actuate the actuator, the lock valve is unlocked in advance, and pilot pressure oil is supplied from the pilot pump to the operating device via the lock valve. Following this, the pilot pressure oil supplied with operation of the operating lever of the operating device is applied to the control part of the directional control valve, causing the directional control valve to switch from the neutral position. At this time, in the open position setting section, the pressure sensor detects the pressure of the pilot pressure oil supplied with the operation of the operating device, and outputs the corresponding detection signal to the controller. The controller that has received this signal controls the control valve to keep the close position. Hence, pilot pressure oil is not supplied from the pilot pump to the control part of the open/close valve, thereby avoiding a situation where the open/close valve is switched from the open position to the close position during actuation of the actuator. In this way, in the open position setting section, the process of setting the open/close valve to the open position can be performed by the controller in accordance with the detection signal of the pressure of the pilot pressure oil supplied with the operation of the operating lever of the operating device which is obtained from the pressure sensor, without direct regard to the movement of the operating lever of the operating device. Accordingly, it is possible to prevent an excessive amount of pressure oil from being supplied from the pilot pump to the actuator due to the above-mentioned specific process during switching operation of the directional control valve, thereby enhancing reliability in operation of the operating lever of the operating device.

An exhaust gas treatment apparatus for a working machine according to an embodiment of the present invention enables a specific process in the exhaust gas treatment section to be carried out, by keeping the open/close valve in the close position and raising the output of the engine, and includes an open position setting section that performs a process of setting the open/close valve to the open position in accordance with the pilot pressure oil supplied from the pilot pump. Therefore, in the state with the lock valve unlocked in advance to enable operation of the operating lever of the operating device, the process of setting the open/close valve to the open position can be performed by the open position setting section in accordance with the pilot pressure oil supplied from the pilot pump via the lock valve, without direct regard to the movement of the operating lever of the operating device. Thus, even when a signal indicating that it is necessary to start the above-mentioned specific process is outputted by the detecting section, the flow of pressure oil to the tank is not blocked, thereby preventing the load on the hydraulic pump from rising excessively. This makes it possible to reliably prevent the specific process that raises the exhaust temperature of the exhaust gas treatment section by raising the output of the engine from being carried out during switching operation of the directional control valve. Further, since an excessive amount of pressure oil is not supplied to the actuator, operation of the actuator in a manner not intended by the operator is prevented, thereby improving safety in operating the working machine over the related art.

BRIEF DESCRIPTION OF THE DRAWINGS

Embodiments of the present invention will be described in detail based on the following drawings, wherein.

DETAILED DESCRIPTION OF THE INVENTION

Hereinbelow, modes for implementing an exhaust gas treatment apparatus for a working machine according to the present invention will be described with reference to the drawings.

First Embodiment

Figure 1:
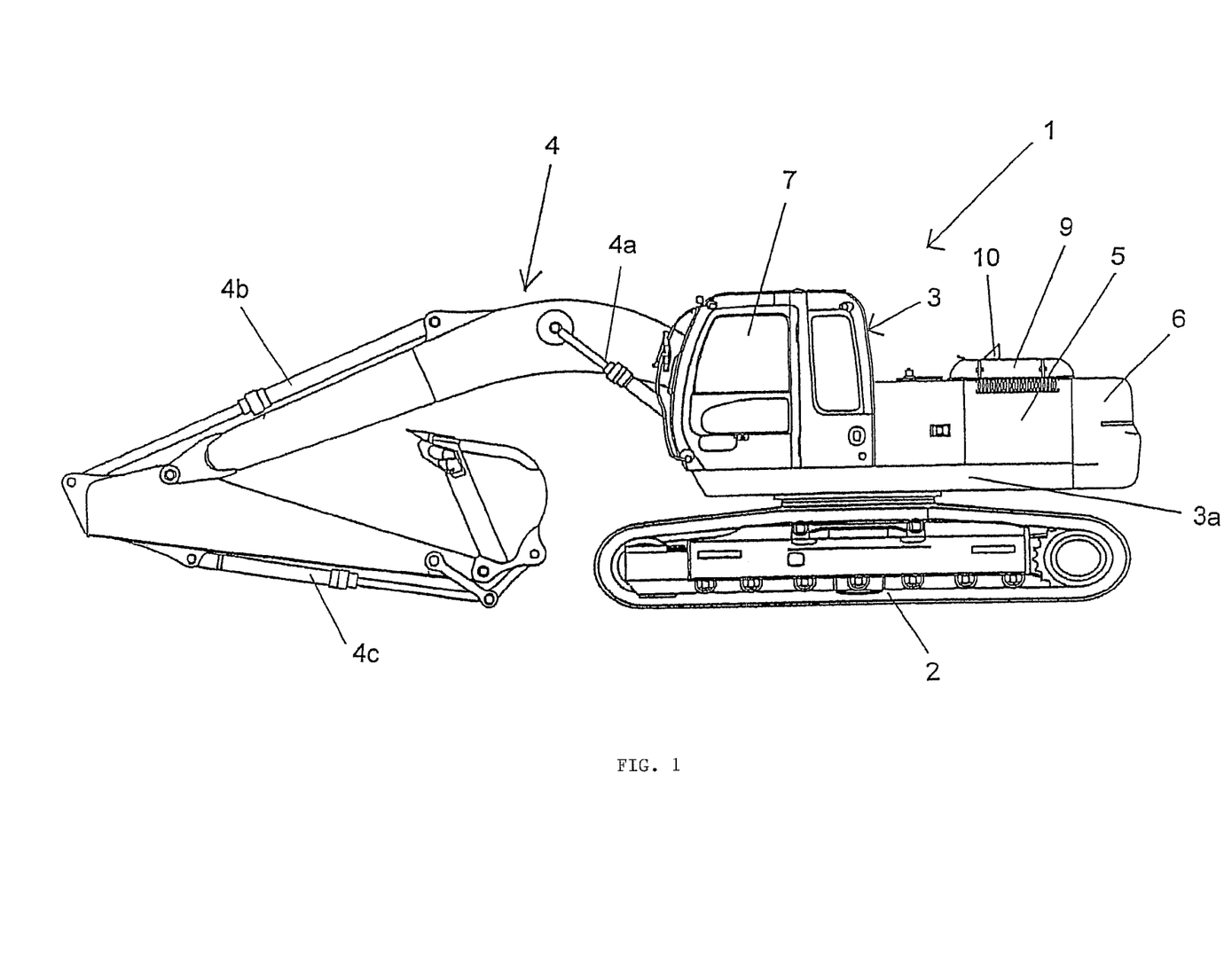
FIG. 1 is a side view showing a hydraulic excavator illustrated as an example of a working machine equipped with an exhaust gas treatment apparatus for a working machine according to a first embodiment of the present invention.

An exhaust gas treatment apparatus for a working machine according to a first embodiment of the present invention is provided in, for example, a hydraulic excavator 1 as shown in FIG. 1. The hydraulic excavator 1 has a travelling body 2, a swing body 3 arranged above the travelling body 2 and having a swing frame 3a, and a front attachment 4 that is attached to the front of the swing body 3 and rotates in the vertical direction. The front attachment 4 includes actuators 4a, 4b, and 4c for controlling a boom, an arm, and a bucket, respectively. Also, the swing body 3 includes a cab 7 located at the front, a counterweight 6 arranged at the rear, and an engine room 5 that is arranged between the cab 7 and the counterweight 6, and has an engine 5a described later inside.

Figure 2:
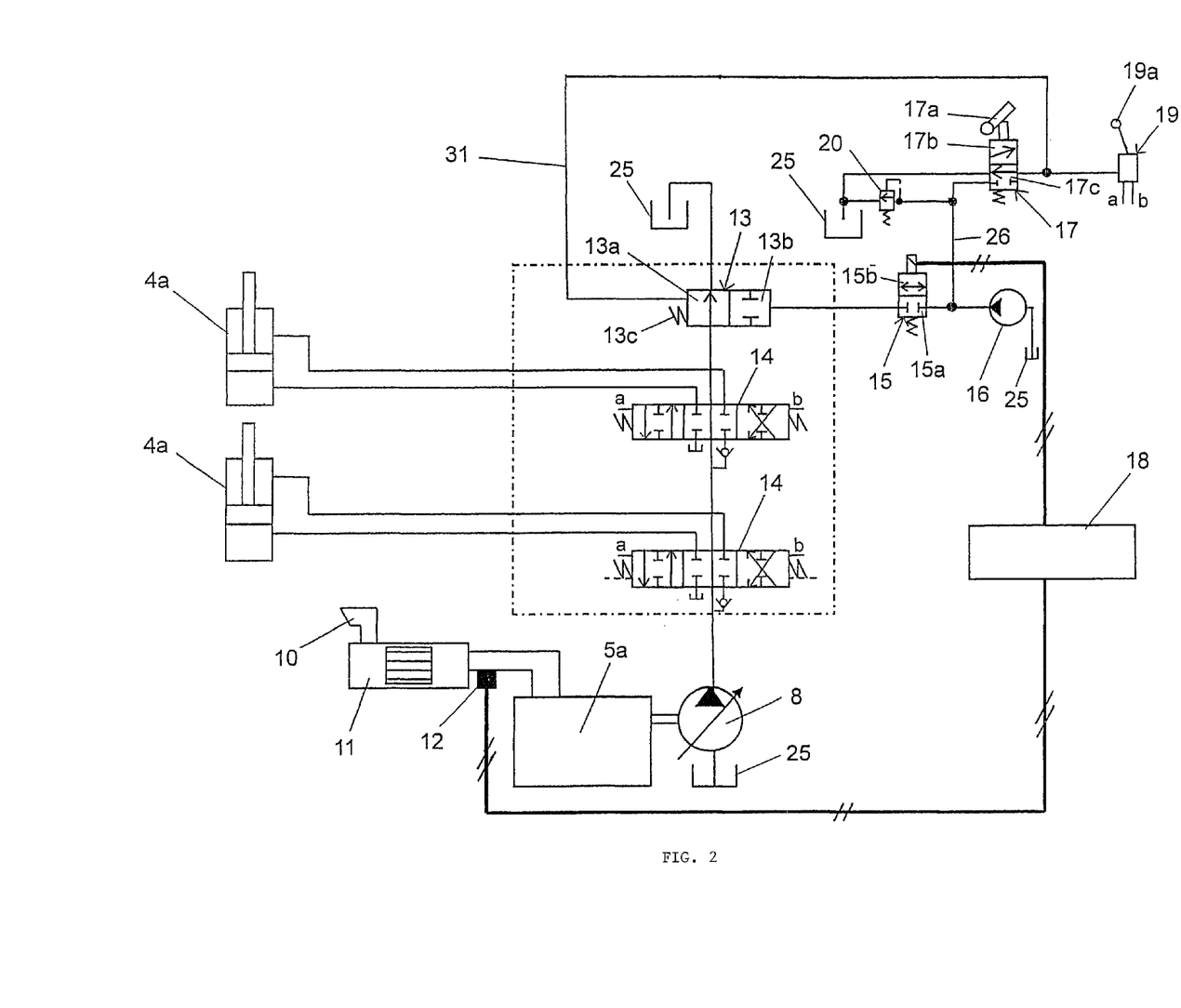
FIG. 2 is a circuit diagram showing the configuration of the first embodiment of the present invention.

As shown in FIG. 2, the exhaust gas treatment apparatus according to the first embodiment of the present invention includes a hydraulic pump 8 that is driven by the engine 5a arranged inside the engine room 5, the above-described actuator 4a that is actuated upon supply of pressure oil from the hydraulic pump 8, a directional control valve 14 that controls the flow of pressure oil supplied to the actuator 4a, and an operating device 19 having an operating lever 19a operated to switch the directional control valve 14. It should be noted that for the simplicity of description, of the actuators 4a, 4b, and 4c, only the actuator 4a is illustrated, and the other actuators 4b and 4c are not shown.

Also, the exhaust gas treatment apparatus according to the first embodiment of the present invention includes: a pilot pump 16 that supplies pressure oil to the operating device 19; an open/close valve 13 that is arranged downstream of the directional control valve 14 and is connected to a tank 25, and whose neutral position is set to an open position 13a by a spring 13c, for example; a control valve 15 that is arranged between the open/close valve 13 and the pilot pump 16, and controls the open/close valve 13 to the open position 13a or a close position 13b; and a lock valve 17 that is arranged between the pilot pump 16 and the operating device 19, and can be switched by operation of a lock lever 17a between a lock position 17c for keeping actuation of the actuator 4a disabled, and an unlock position 17b for enabling actuation of the actuator 4a. It should be noted that the hydraulic pump 8, the pilot pump 16, and the lock valve 17 are connected to the tank 25. A relief valve 20 is provided in a pipe 26 connecting between the pilot pump 16 and the lock valve 17. When the pilot pressure oil supplied from the pilot pump 16 becomes excessive, the relief valve 20 relieves the excess pilot pressure oil to the tank 25.

Further, the exhaust gas treatment apparatus according to the first embodiment of the present invention includes: an exhaust gas treatment section 11 that treats exhaust gas emitted from the engine 5a; a detecting section 12 that detects when a specific process that raises the exhaust temperature of the exhaust gas treatment section 11 becomes necessary, and outputs a signal for switching the control valve 15 to the open position; and a controller 18 that controls the control valve 15. The specific process in the exhaust gas treatment section 11 can be carried out by keeping the open/close valve 13 in the close position 13b and raising the output of the engine 5a.

Further, the exhaust gas treatment apparatus according to the first embodiment of the present invention includes an open position setting section that performs a process of setting the opening/close valve 13 to the open position 13a in accordance with the pilot pressure oil supplied from the pilot pump 16. This open position setting section includes: the pilot pump 16; the lock valve 17 that is kept in the unlock position 17b for supplying pilot pressure oil from the pilot pump 16 to the operating device 19; and a pipe 31 whose one end is connected in between the lock valve 17 and the operating device 19, and whose other end is connected to a control part on the left side of the open/close valve 13 so that the open/close valve 13 is set to the open position 13a by introducing the pilot pressure oil flowing between the lock valve 17 and the operating device 19. It should be noted that in the first embodiment of the present invention, portions corresponding to those of the exhaust gas treatment apparatus for a working machine according to the related art shown in FIG. 5 described above are denoted by the same symbols.

In the first embodiment of the present invention configured in this way, when the lock valve 17 is kept in the lock position 17c, pilot pressure oil is not supplied to the operating device 19, and thus pilot pressure oil is not introduced from the pipe 31 in the open position setting section. At this time, the opening/close valve 13 is kept in the open position 13a that is the neutral position with the force of the spring 13c. Also, in the state with the lock valve 17 kept in the lock position 17c in this way to disable actuation of the actuator 4a, when the detecting section 12 outputs a signal indicating that it is necessary to start a specific process that raises the exhaust temperature of the exhaust gas treatment section 11, the control valve 15 is switched to the open position 15b that is the upper position by a signal outputted from the controller 18.

Thus, the pilot pressure oil from the pilot pump 16 is applied to a control part on the right side of the open/close valve 13 via the control valve 15, and the open/close valve 13 is switched from the open position 13a that is the neutral position to the close position 13b, against the force of the spring 13c. Then, the flow of pressure oil to the tank 25 is blocked, and the load on the hydraulic pump 8 rises. Accordingly, the output of the engine 5a is raised, and the specific process that raises exhaust temperature is carried out in the exhaust gas treatment section 11.

On the other hand, to actuate the actuator 4a, the lock valve 17 is unlocked in advance, in other words, the lock valve 17 is switched by operation of the lock lever 17a from the lock position 17c to the unlock position 17b, and pilot pressure oil is supplied from the pilot pump 16 to the operating device 19 via the lock valve 17. Then, the pilot pressure oil supplied with operation of the operating lever 19a of the operating device 19 is applied to the control part of the directional control valve 14, causing the directional control valve 14 to switch from the neutral position. Accordingly, the pressure oil discharged from the hydraulic pump 8 is supplied to the actuator 4a via the directional control valve 14, thereby actuating the actuator 4a.

Therefore, in the state with the lock valve 17 unlocked in this way to enable operation of the operating lever 19a of the operating device 19, by introducing pilot pressure oil to the control part on the left side of the open/close valve 13 from the pipe 31 whose one end is connected in between the lock valve 17 and the operating device 19, the process of setting the open/close valve 13 to the open position 13a can be performed in accordance with the pilot pressure oil supplied from the pilot pump 16, without direct regard to the movement of the operating lever 19a of the operating device 19. In this state, when the controller 18 receives, from the detecting section 12, a signal indicating the start of the specific process that raises the exhaust temperature of the exhaust gas treatment section 11, and accordingly controls the control valve 15 to switch from the close position 15a to the open position 15b, pilot pressure oil from the pilot pump 16 is supplied to the control part on the right side of the open/close valve 13 via the control valve 15. At this time, the same pilot pressure oil from the pilot pump 16 is introduced to the control parts on the left and right of the open/close valve 13. Therefore, the open/close valve 13 is kept in the neutral position with the force of the spring 13c. This prevents the load on the hydraulic pump 8 from increasingly excessively, thus avoiding a situation where, following such an increase in load, the above-described specific process that raises exhaust temperature by raising the output of the engine 5a is started. This makes it possible to reliably prevent the specific process that raises the exhaust temperature of the exhaust gas treatment section 11 from being carried out during switching operation of the directional control valve 14. Since an excessive amount of pressure oil is not supplied to the actuator 4a, operation of the actuator 4a in a manner not intended by the operator is prevented, thereby improving safety in operating the hydraulic excavator 1.

Also, in the first embodiment of the present invention, one end of the pipe 31 included in the open position setting section is connected in between the lock valve 17 and the operating device 19, and the other end of the pipe 31 is connected to the control part on the left side of the open/close valve 13 so that the open/close valve 13 is set to the open position 13a by introducing the pilot pressure oil flowing between the lock valve 17 and the operating device 19. In the state when the lock valve 17 is in the unlock position 17b, in other words, when actuation of the actuator 4a is enabled, the open/close valve 13 can be kept in the open position 13a solely by such a simple configuration. Therefore, since it suffices to simply provide the pipe 31 that connects to the control part of the open/close valve 13 from in between the lock valve 17 and the operating device 19, assembly cost for the open position setting section can be minimized.

Second Embodiment

Figure 3:
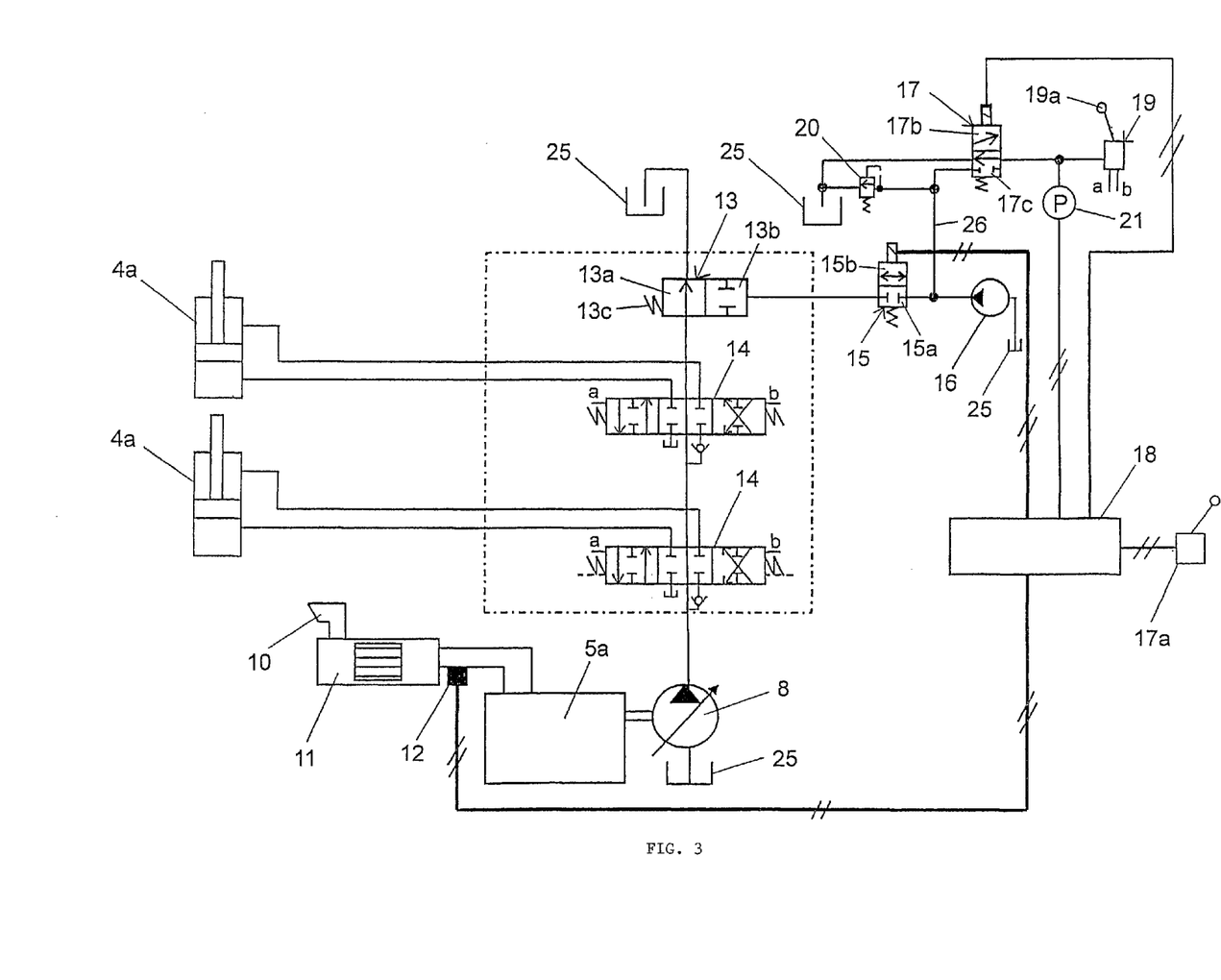
FIG. 3 is a circuit diagram showing the configuration of a second embodiment of the present invention.

FIG. 3 is a circuit diagram showing the configuration of a second embodiment of the present invention.

As shown in FIG. 3, in the second embodiment of the present invention, the open position setting section includes a pressure sensor 21 that detects the pilot pressure oil that has passed through the lock valve 17, and the controller 18 that controls the control valve 15 to keep the close position 15a in accordance with the detection of the pressure of the pilot pressure oil by the pressure sensor 21. When pilot pressure oil is not detected by the pressure sensor 21, the controller 18 controls the control valve 15 to keep the close position 15a that is the lower position in the state when no signal is outputted from the detecting section 12, and the controller 18 controls the control valve 15 to switch to the open position 15b that is the upper position in the state when a signal is outputted from the detecting section 12. Also, when pilot pressure oil is detected by the pressure sensor 21, the controller 18 controls the control valve 15 to keep the close position 15a that is the lower position, irrespective of whether or not a signal has been outputted from the detecting section 12. Otherwise, the second embodiment is configured in the same manner as the first embodiment.

In the second embodiment of the present invention configured in this way, in the state with the lock valve 17 kept in the lock position 17c, the pressure of the pilot pressure oil having passed through the lock valve 17 is not detected by the pressure sensor 21. In this state, actuation of the actuator 4a is disabled as in the first embodiment. When, in this state, a signal indicating that it is necessary to start a specific process that raises the exhaust temperature of the exhaust gas treatment section 11 is outputted by the detecting section 12, since the pressure of pilot pressure oil has not been detected by the pressure sensor 21, the controller 18 controls the control valve 15 to switch from the close position 15a to the open position 15b. Thus, the pilot pressure oil from the pilot pump 16 is applied to the control part on the right side of the open/close valve 13 via the control valve 15, and the open/close valve 13 is switched from the open position 13a that is the neutral position to the close position 13b. Then, the flow of pressure oil to the tank 25 is blocked, and the load on the hydraulic pump 8 rises. Accordingly, the output of the engine 5a is raised, and the specific process that raises exhaust temperature is carried out in the exhaust gas treatment section 11.

On the other hand, to actuate the actuator 4a, the lock valve 17 is unlocked in advance, in other words, the lock valve 17 is switched by operation of the lock lever 17a from the lock position 17c to the unlock position 17b, and pilot pressure oil is supplied from the pilot pump 16 to the operating device 19 via the lock valve 17. Following this, pilot pressure oil supplied with operation of the operating lever 19a of the operating device 19 is applied to the control part of the directional control valve 14, causing the directional control valve 14 to switch from the neutral position. At this time, in the open position setting section, the pressure sensor 21 detects the pressure of the pilot pressure oil that has passed through the lock valve 17 and is supplied to the operating device 19, and outputs the corresponding detection signal to the controller 18. The controller 18 that has received this signal controls the control valve 15 to keep the close position 15a, irrespective of whether or not a signal indicating the start of the specific process that raises the exhaust temperature of the exhaust gas treatment section 11 has been received from the detecting section 12. Hence, pilot pressure oil is not supplied from the pilot pump 16 to the control part on the right side of the open/close valve 13, thereby avoiding a situation where the open/close valve 13 is switched from the open position 13a to the close position 13b during actuation of the actuator 4a. Therefore, in the open position setting section, the process of setting the open/close valve 13 to the open position 13a can be performed by the controller 18 in accordance with the detection signal of the pressure of the pilot pressure oil having passed through the lock valve 17 which is obtained from the pressure sensor 21, without direct regard to the movement of the operating lever 19a of the operating device 19. Accordingly, it is possible to prevent an excessive amount of pressure oil from being supplied from the hydraulic pump 8 to the actuator 4a due to the above-mentioned specific process during switching operation of the directional control valve 14, thereby enhancing reliability in operation of the operating lever 19a of the operating device 19.

Third Embodiment

Figure 4:
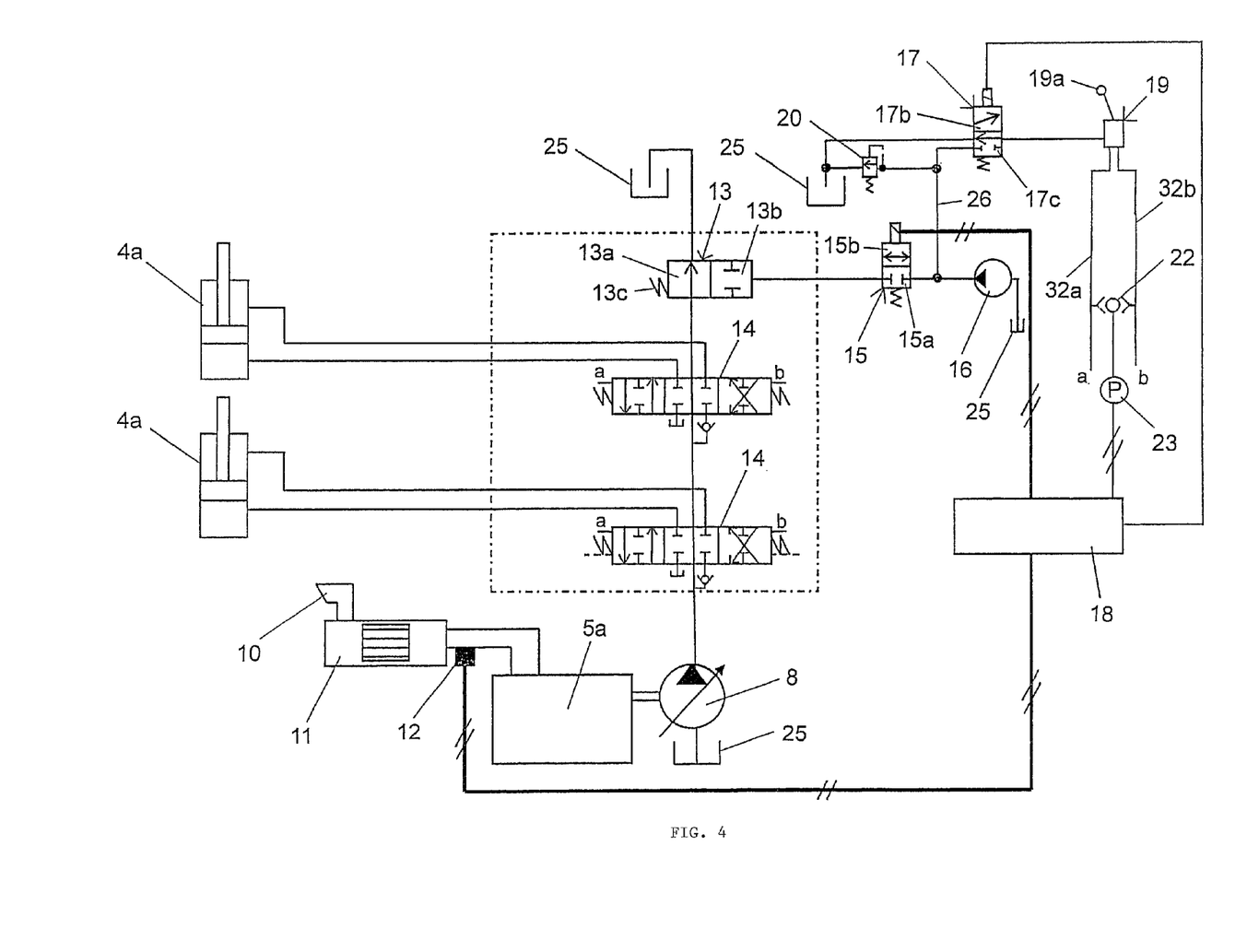
FIG. 4 is a circuit diagram showing the configuration of a third embodiment of the present invention.

FIG. 4 is a circuit diagram showing the configuration of a third embodiment of the present invention.

As shown in FIG. 4, in the third embodiment of the present invention, the open position setting section includes a pressure sensor 23 that detects the pressure of the pilot pressure oil supplied with operation of the operating lever 19a of the operating device 19, and the controller 18 that controls the control valve 15 to the close position 15a in accordance with the detection of the pressure of the pilot pressure oil by the pressure sensor 23. Specifically, the exhaust gas treatment apparatus according to the third embodiment of the present invention includes: a pipe 32a that connects between the operating device 19 and the directional control valve 14, and introduces pilot pressure oil for setting the directional control valve 14 to the left position; a pipe 32b that connects between the operating device 19 and the directional control valve 14, and introduces pilot pressure oil for setting the directional control valve 14 to the right position; and a shuttle valve 22 that is installed between the pipes 32a and 32b, and detects the higher one of the pressures of pilot pressure oil flowing through the pipes 32a and 32b. The above-described pressure sensor 23 detects the pressure of pilot pressure oil selected by the shuttle valve 22, and outputs the corresponding detection signal to the controller 18. Otherwise, the third embodiment is configured in the same manner as the second embodiment.

In the third embodiment of the present invention configured in this way, in the state with the lock valve 17 kept in the lock position 17c, the pressure of the pilot pressure oil supplied with operation of the operating lever 19a of the operating device 19 is not detected by the pressure sensor 23 connected to the shuttle valve 22. In this state, actuation of the actuator 4a is disabled in this state. When, in this state, a signal indicating that it is necessary to start a specific process that raises the exhaust temperature of the exhaust gas treatment section 11 is outputted by the detecting section 12, since a detection signal of the pressure of pilot pressure oil has not been outputted from the pressure sensor 23, the controller 18 controls the control valve 15 to switch from the close position 15a to the open position 15b. Thus, the pilot pressure oil from the pilot pump 16 is applied to the control part on the right side of the open/close valve 13 via the control valve 15, and the open/close valve 13 is switched from the open position 13a that is the neutral position to the close position 13b. Then, the flow of pressure oil to the tank 25 is blocked, and the load on the hydraulic pump 8 rises. Accordingly, the output of the engine 5a is raised, and the specific process that raises exhaust temperature is carried out in the exhaust gas treatment section 11.

On the other hand, to actuate the actuator 4a, the lock valve 17 is unlocked in advance, in other words, the lock valve 17 is switched by operation of the lock lever 17a from the lock position 17c to the unlock position 17b, and pilot pressure oil is supplied from the pilot pump 16 to the operating device 19 via the lock valve 17. Accordingly, as the operating lever 19a of the operating device 19 is operated, pilot pressure oil is applied to the control part of the directional control valve 14 via one of the pipes 32a and 32b, causing the directional control valve 14 to switch from the neutral position. At this time, in the open position setting section, the pressure sensor 23 detects the pressure of pilot pressure oil supplied with the operation of the operating lever 19a of the operating device 19, in other words, the pressure sensor 23 connected to the shuttle valve 22 detects the higher one of the pressures of pilot pressure oil flowing through the pipes 32a and 32b, and outputs the corresponding detection signal to the controller 18. The controller 18 that has received this signal controls the control valve 15 to keep the close position 15a. Hence, pilot pressure oil is not supplied from the pilot pump 16 to the control part on the right side of the open/close valve 13, thereby avoiding a situation where the open/close valve 13 is switched from the open position 13a to the close position 13b during actuation of the actuator 4a. In this way, in the open position setting section, the process of setting the open/close valve 13 to the open position 13a can be performed by the controller 18 in accordance with the detection signal of the pressure of pilot pressure oil supplied with the operation of the operating lever 19a of the operating device 19 which is obtained from the pressure sensor 23, without direct regard to the movement of the operating lever 19a of the operating device 19. Accordingly, as in the second embodiment, it is possible to prevent an excessive amount of pressure oil from being supplied from the hydraulic pump 8 to the actuator 4a due to the above-mentioned specific process during switching operation of the directional control valve 14, thereby enhancing reliability in operation of the operating lever 19a of the operating device 19.

While the above embodiments are directed to the case of purifying exhaust gas by use of an oxidation catalyst as an example of an exhaust gas treatment apparatus, the present invention is not limited to this. The present invention is also applicable to regeneration control of a diesel particulate filter (DPF) that captures and removes particulate matter (PM) in exhaust gas.

What is claimed is:

1. An exhaust gas treatment apparatus for a working machine, comprising:
a hydraulic pump driven by an engine;
an actuator that is actuated upon supply of pressure oil from the hydraulic pump;
a directional control valve that controls a flow of the pressure oil supplied to the actuator;
an operating device having an operating lever operated to switch the directional control valve;
a pilot pump that supplies pressure oil to the operating device;
an open/close valve that is arranged downstream of the directional control valve and connected to a tank, and whose neutral position is an open position;

a control valve that is arranged between the open/close valve and the pilot pump, and controls the open/close valve to the open position or a close position;

a lock valve that is arranged between the pilot pump and the operating device, and can be switched to a lock position for keeping actuation of the actuator disabled;

an exhaust gas treatment section that treats exhaust gas emitted from the engine;

a detecting section that detects when a specific process that raises an exhaust temperature of the exhaust gas treatment section is necessary, and outputs a signal for setting the control valve to an open position;

a controller that controls the control valve; and an open position setting section that performs a process of setting the open/close valve to the open position in accordance with pilot pressure oil supplied from the pilot pump, wherein the specific process in the exhaust gas treatment section can be carried out by keeping the open/close valve in the close position and raising an output of the engine.

2. The exhaust gas treatment apparatus for a working machine according to claim 1, wherein the open position setting section includes:

the pilot pump;

the lock valve that is kept in an unlock position for supplying the pilot pressure oil from the pilot pump to the operating device; and a pipe that has one end connected in between the lock valve and the operating device, and introduces the pilot pressure oil for setting the open/close valve to the open position.

3. The exhaust gas treatment apparatus for a working machine according to claim 1, wherein the open position setting section includes:

the pilot pump;

the lock valve that is kept in an unlock position for supplying the pilot pressure oil from the pilot pump to the operating device;

a pressure sensor that detects a pressure of the pilot pressure oil that has passed through the lock valve; and the controller that controls the control valve to keep a close position in accordance with detection of the pressure of the pilot pressure oil by the pressure sensor.

4. The exhaust gas treatment apparatus for a working machine according to claim 1, wherein the open position setting section includes:

the pilot pump;

the lock valve that is kept in an unlock position for supplying the pilot pressure oil from the pilot pump to the operating device;

a pressure sensor that detects a pressure of the pilot pressure oil supplied with operation of the operating lever of the operating device; and the controller that controls the control valve to keep a close position in accordance with detection of the pressure of the pilot pressure oil by the pressure sensor.

* * * * *